(12) United States Patent
Mezhibovsky et al.

(10) Patent No.: US 9,560,199 B2
(45) Date of Patent: Jan. 31, 2017

(54) VOICE RESPONSE PROCESSING

(71) Applicants: Alcatel Lucent, Boulogne Billancourt (FR); Genesys Telecommunications Laboratories, Inc., Daly City, CA (US)

(72) Inventors: Vladimir Mezhibovsky, San Francisco, CA (US); Jerome Saint-Marc, Paris (FR)

(73) Assignees: Genesys Telecommunications Laboratories, Inc., Daly City, CA (US); Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/341,572

(22) Filed: Jul. 25, 2014

(65) Prior Publication Data

US 2014/0334614 A1  Nov. 13, 2014

Related U.S. Application Data

(63) Continuation of application No. 12/713,806, filed on Feb. 26, 2010, now abandoned.

(51) Int. Cl.
| | |
|---|---|
| *H04M 1/64* | (2006.01) |
| *H04M 3/493* | (2006.01) |
| *H04M 3/42* | (2006.01) |
| *H04W 4/12* | (2009.01) |
| *H04M 3/51* | (2006.01) |

(52) U.S. Cl.
CPC ....... *H04M 3/4936* (2013.01); *H04M 3/42382* (2013.01); *H04M 3/493* (2013.01); *H04M 3/5183* (2013.01); *H04W 4/12* (2013.01); *H04M 3/51* (2013.01); *H04M 2201/38* (2013.01); *H04M 2203/254* (2013.01); *H04M 2203/651* (2013.01)

(58) Field of Classification Search
CPC combination set(s) only.
See application file for complete search history.

(56) References Cited

U.S. PATENT DOCUMENTS

| | | | |
|---|---|---|---|
| 7,136,478 B1 * | 11/2006 | Brand et al. | 379/265.09 |
| 7,813,485 B2 * | 10/2010 | Yin et al. | 379/88.13 |
| 7,924,985 B2 * | 4/2011 | Rinaldo et al. | 379/88.14 |
| 8,090,083 B2 * | 1/2012 | Fong | H04M 3/385 379/100.13 |
| 8,139,725 B2 * | 3/2012 | Cohen | H04M 3/493 370/352 |
| 8,265,234 B2 * | 9/2012 | Singh | 379/88.04 |
| 8,340,255 B2 * | 12/2012 | Rotsztein et al. | 379/88.18 |
| 8,340,969 B2 * | 12/2012 | Malo | G06F 3/0482 379/88.01 |
| 8,582,729 B2 * | 11/2013 | Minear | H04M 3/493 379/11 |

(Continued)

*Primary Examiner* — Joseph T Phan
(74) *Attorney, Agent, or Firm* — Stephen J. Wyse

(57) ABSTRACT

A method for transmitting choices to a caller has steps of (a) interacting by voice with a caller using a communication device; (b) encountering a point in the interaction that a choice between two or more options is to be provided to the caller; (c) determining if the caller's communication device is capable of receiving a text message; (d) selecting a compatible text message comprising the options; (e) associating with the text message a text message destination address to the caller's device; and (f) transmitting the text message to the caller's device. The interaction may be by IVR or by a live agent.

14 Claims, 5 Drawing Sheets

(56) References Cited

U.S. PATENT DOCUMENTS

| | | | |
|---|---|---|---|
| 8,750,468 B2 * | 6/2014 | Manley et al. | 379/88.19 |
| 8,908,847 B2 * | 12/2014 | Berger | H04M 3/4285 |
| | | | 379/210.01 |
| 9,119,049 B2 * | 8/2015 | Cai | H04W 4/18 |
| 9,270,817 B2 * | 2/2016 | Bigue | H04M 3/428 |
| 2014/0314225 A1 * | 10/2014 | Riahi | H04M 3/5235 |
| | | | 379/265.09 |

* cited by examiner

VOICE RESPONSE PROCESSING

CROSS-REFERENCE TO RELATED APPLICATIONS

The present disclosure is a continuation of and claims priority from U.S. patent application Ser. No. 12/713,806 entitled Voice Response Processing, and filed on 26 Feb. 2010, the entire contents of which are incorporated by reference herein.

BACKGROUND OF THE INVENTION

1. Field of the Invention

The present invention is in the field of telephony communications including data network telephony (DNT) and pertains particularly to methods and a system for dynamic addition of a visual channel during a voice interaction.

2. Discussion of the State of the Art

In the art of telephony, there are call centers that specialize in processing telephone calls. A state-of-art call center has access to a central telephone switch and a local area network (LAN) supporting telephony equipment such as telephones, computing appliances, servers, and the like. In most such call centers, an interactive voice response (IVR) unit is accessible to the center for intercepting calls destined for the center.

The IVR unit is typically adapted for customer self service. However, IVR units may be used to screen callers for routing to live agents within the call center or working remotely from the center but connected to the center by a wireless or wired carrier network.

In IVR interaction, a voice application is played for the caller and the caller interacts with menu options that the caller hears the voice platform play. Interaction with such enunciated voice menus can be difficult. This is partly due to confusion because of the recitation of many options presented serially to the caller through the voice interface. Often a caller must replay the menu and listen to the available options again and again before selecting one. This creates delay in the system that could lead to delay in call processing and to reduction of call processing efficiency.

Therefore, what is clearly needed is a system for enabling dynamic addition of a visual channel to a voice transaction in process so that menu options may be presented over the visual channel and may display at the caller's end, enabling quicker, more efficient and error free interaction with the system. Such a system would reduce call processing delays and increase overall call processing efficiency within the call center.

SUMMARY OF THE INVENTION

The problem stated above is that efficiency is desirable for an interactive voice response (IVR) system operating in a telephony environment, but many of the conventional methods for voice interaction with called or calling parties, such as by traditional voice-based interactive voice response units, also create delays. The inventors therefore considered functional components of an IVR system, looking for elements that exhibit interoperability that could potentially be harnessed to provide a more efficient IVR experience, but in a manner that would not create confusion or add delays.

Every IVR system is enabled by one or more voice applications, one by-product of which is an abundance of users interacting with the system with at least a portion thereof finding the interactive experience confusing requiring frequent repetition of IVR menus. Most such systems employ voice applications which execute at the time of interception of caller by the IVR system. Voice applications and application servers are typically a part of such apparatus.

The present inventors realized in an inventive moment that if, at the point of caller intercept, IVR menu options could be simultaneously presented to callers over a text channel in addition to the voice channel, significant efficiency in the overall IVR call processing might result. The inventor inventors therefore constructed a unique IVR system for interacting with potential customers in a telephony environment that allowed menu options to be vocalized to customers and presented visually to those same customers through a text messaging interface. A significant reduction of work results, with no impediment to the business process created.

Accordingly, in one embodiment of the present invention, a method for transmitting choices to a caller is provided, comprising the steps of (a) interacting by voice with a caller using a communication device; (b) encountering a point in the interaction that a choice between two or more options is to be provided to the caller; (c) determining if the caller's communication device is capable of receiving a text message; (d) selecting a compatible text message comprising the options; (e) associating with the text message a text message destination address to the caller's device; and (f) transmitting the text message to the caller's device.

In one embodiment of the method, in step (a), interaction by voice with the caller is by an interactive voice response (IVR) system utilizing a voice application. In this embodiment individual portions of the IVR script providing choices by voice are tagged as associated with text messages providing the same choices, and when such a portion is encountered in the transaction, the associated text message is sent to the caller's device using the text message destination address. Determination may be made by a voice query to the caller, answered by the caller.

In another embodiment, in, in step (a), interaction by voice with the caller is by a live agent at a station to which the call is routed. In this embodiment the the live agent operates a computerized appliance executing a desktop application, and the desktop application provides standardized text messages of choices the live agent may wish to communicate to the caller, and when the live agent encounters a point in the voice interaction where the agent determines to send a choice to the caller, the agent is enabled to select the associated text message and enter the text message destination address of the caller to send the text message.

In another aspect of the invention a system for transmitting choices to a caller using a communication device is provided, comprising a switch receiving a voice call from the caller, an end point having voice interaction capability to which the call is routed from the switch, software operating at the end point having access to standardized text messages offering options. A determination is made as to whether the caller's communication device is enabled to receive text messages, and, upon encountering a point in the transaction with the caller that a choice between two or more options is to be provided to the caller, a compatible text message comprising the options is selected, a text message destination address to the caller's device is associated with the text message, and the text message is transmitted to the caller's device.

In one embodiment of the system the end point is an interactive voice response (IVR) system utilizing a voice application. In this embodiment individual portions of the IVR script providing options by voice are tagged as associated with text messages providing the same options, and when such a portion is encountered in the transaction, the associated text message is sent to the caller's device using the text message destination address. Determination of whether the caller's device can accept text messages may be made by a voice query to the caller, answered by the caller.

In another embodiment of the system the end point is a station where the call is connected to a live agent for voice response. In this embodiment the live agent operates a computerized appliance executing a desktop application, and the desktop application provides standardized text messages of choices the live agent may wish to communicate to the caller, and when the live agent encounters a point in the voice interaction where the agent determines to send a choice to the caller, the agent is enabled to select the associated text message and enter the text message destination address of the caller to send the text message.

BRIEF DESCRIPTION OF THE DRAWING FIGURES

DETAILED DESCRIPTION

The inventors provide a unique interactive multi-modal customer service system for a call center that enables dynamic addition of a visual channel for interaction in addition to an established voice channel. The system and methods of the present invention are described in enabling detail below using the following examples, which may describe more than one embodiment of the present invention.

Figure 1:
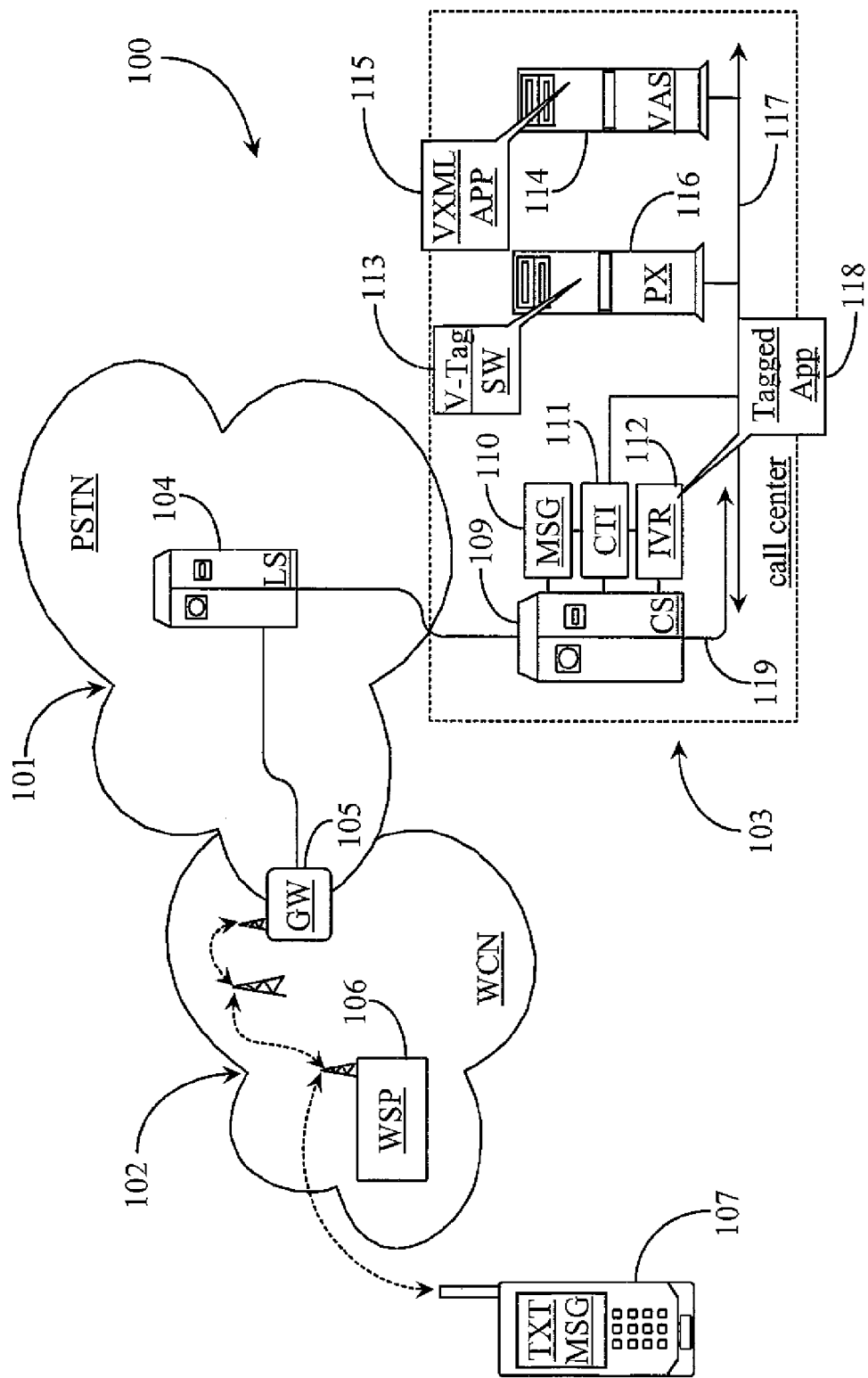
FIG. 1 is an architectural overview of a communications network supporting dynamic multi-channel customer service according to an embodiment of the present invention.

FIG. 1 is an architectural overview of a communications network 100 supporting dynamic multi-channel customer service according to an embodiment of the present invention. Communications network 100 includes a public switched telephony network (PSTN) 101, a connected wireless carrier network (WCN) 102, and a connected call center (CC) 103. PSTN 101 may be a private telephony network instead of the public switched network without departing from the spirit and scope of the present invention.

Call center 103 represents any enterprise call center or contracted center that interfaces with customers and processes transactions involving those customers. CC 103 has a local area network (LAN) 117 provided therein and adapted for Internet communication using transfer control protocol over Internet protocol (TCP/IP) and like Internet transport and communications protocols. CC 103 may have connections to both the Internet and to the public telephone network without departing from the spirit and scope of the present invention. In this regard, CC 103 may process both analog transactions and digital transactions that have arrived via the Internet, for example. In this example the Internet and associated connection architecture is not illustrated, but may be presumed present.

LAN 117 in CC 103 supports a computer telephony integrated (CTI) central telephone switch (CS) 109. CS 109 is computer integrated using a CTI processor 111 having a direct connection to LAN 117. CS 109 has a direct connection to a local telephone switch (LS) 104 illustrated within PSTN 101 via telephone trunking CTI processor 111 is connected to CS 109 by a CTI link. CS 109 may be an automated call distributor (ACD) or a private branch exchange (PBX) or some other type of telephone switching apparatus including a soft switch (switch implemented in software) without departing from the spirit and scope of the present invention. CS 109 may optionally be a leased switch off site maintained by a third-party service provider. In this example, CS 109 includes internal telephone wiring 119 that may connect the switch to internal telephones manned by live agents. Agent stations are not illustrated in this example, but may be presumed present.

CS 109 has CTI access to an interactive voice response (IVR) unit 112. IVR unit 112 may be a separate piece of hardware connected to switch 109 or it may be installed on the switch in some cases or integrated with a soft switch in some cases. In this example IVR unit 112 is an intelligent peripheral connected to switch 109 via CTI link or by a separate link. IVR unit 112 may be directly connected to LAN 117 or it may be accessible from LAN 117 through CTI processor 111. IVR unit 112 intercepts transactions waiting at switch 109 and qualifies which of those transactions require live services and which can be disposed of through IVR self service.

LAN 117 supports a voice application server (VAS) 114. VAS 114, as with all other described computing appliances or machines includes a digital medium provided therein or coupled thereto which contains all of the software and data required to enable function, in this case, as a voice application server. VAS 114 is adapted to contain and serve at least one voice application such as a voice extensible markup language (VXML) application (APP) 115. VXML APP 115 is executed and runs on VAS 114 when called by IVR unit 112. There may be many more than one different voice application installed on and executable from VAS 114 without departing from the spirit and scope of the present invention. A VXML application such as VXML APP 115 is designed to connect with a call waiting at switch 109, and to determine what has to be done with the call.

LAN 117 supports a proxy server (PX) 116. PX 116, as with all other described computing appliances or machines, includes a digital medium provided therein or coupled thereto which contains all of the software and data required to enable function, in this case, as a proxy server. PX 116 is adapted to intercept hypertext transfer protocol (HTTP) messages from VAS 114 running VXML APP 115 or a similar instance. The intercepted messages are parsed to determine if there are menu options that may be read by IVR unit 112 during interaction with the customer. VAS 114, as with all other described computing appliances or machines includes a digital medium provided therein or coupled thereto which contains all of the software and data required to enable function, in this case, as a voice application server.

PX 116 with the aid of a visual tagging (V-Tag) SW application 113 provides visualization tagging of any specific menu options in the VXML that may subsequently be speech rendered at IVR unit 112. A tagged application 118 is executing on IVR unit 112 and is being navigated by at least one customer. A messaging system (MSG) 110 is provided in this example and is directed and controlled by CTI processor 111. MSG 110 is adapted to generate short message service (SMS) or media message service (MMS) messages in cooperation with a third-party messaging service provider. MSG 110 may also generate other types of text messages such as those used by Twitter® and other popular third-party messaging services.

A communications appliance 107 is illustrated in this example and is operated by a user not shown. The user is any potential customer of CC 103. The user may also be referred to herein as the caller. Appliance 107 in this embodiment is a third or fourth generation (3G, 4G) cellular telephone. In another embodiment appliance 107 may be a personal digital assistant (PDA), a computer running a telephony application or some other type of network appliance that supports both voice and text channels simultaneously.

Appliance 107 in this embodiment has a wireless connection to a wireless service provider (WSP) 106 within WCN 102. WSP 106 is adapted to provide wireless telephone and Internet services. A call placed on appliance 107 may be registered at CS 109 within CC 103 as a new call waiting to be serviced. The connection past WSP 106 may include various cell towers and a gateway (GW) 105 adapted to bridge communication over WCN 102 and PSTN 101. Once on PSTN 101, the call is connected through LS 104 to CS 109 where the call is waiting to be serviced.

Appliance 107 is enabled for SMS/MMS services and may receive and send SMS and MMS messages while the caller is talking over the voice channel of the appliance. IVR unit 112 intercepts the call via synthesized voice channel as is fairly common in IVR implementation. Dual tone multi-frequency (DTMF) tone selection may also be utilized by IVR unit 112 in interaction with the call using communications appliance 107.

IVR unit 112 receives APP 115 via proxy server 116 as tagged application 118. Tagging SW 113 may use Java tags to tag portions of the VXML application that need to be visually displayed to the caller through appliance 107 in an embodiment of the invention. When IVR unit 112 reaches a tag in tagged application 118, a SMS message, for example, may be generated by SMS/MMS server 110, capturing the IVR menu options included in the tag. The menu options are rendered as text and sent in the form of an SMS or MMS, or another message type to communications appliance 107. In one embodiment a messaging port is added to the IVR unit 112. In one embodiment messaging server 110 is provided and includes a digital medium coupled thereto that contains all of the software and data required to enable function as a messaging server. The message may be immediately displayed on appliance 107 so the caller may read the options while at the same time or perhaps just after receiving the message, the options are recited by the IVR unit.

In one embodiment, when IVR unit 112 reaches a point where a tag is encountered, the system sends the text message before rendering the options as synthesized speech so that the caller, for example, may see the options before they are enunciated by the system over the voice channel. In this case, the caller may respond verbally to the displayed list of options by speaking the desired option from the list of options sent in the message. IVR unit 112 may hear the spoken option and perform a required action without it being necessary for the system to render the option list in speech to the caller. In this way, call processing time is reduced for the caller.

It is noted herein that for any given period of processing, some callers may be known by the system while some callers may be new to the system. A short IVR interaction at the beginning of a call may ask the caller if they would like to use visual prompting over a text channel If the caller decides not to use visual prompting at the beginning of interaction, then V-Tag SW 113 and PX 116 may not be utilized to enhance that caller's experience. However, if the caller opts in to the visual prompting solution, menu options in VXML are dynamically tagged before service so that text messages may be generated and sent to the caller at the same time or just before the IVR unit renders the options as voice to the caller. Once callers have opted into visual prompting through text messaging, the system automatically treats the caller with visual prompting each time the caller calls in using the same communications appliance.

In most embodiments of the present invention voice rendering and text messaging are directed by the IVR system to the same communications device used by a caller to call into the center. A session management module (not illustrated) may be provided to ensure that only navigated menu options are tagged and visually displayed to callers over a text channel at the same time or before the voice rendering of the options would commence. In an embodiment where a voice application remains constant and is not subject to constant revision, the voice application may be tagged using V-Tag SW anywhere a menu with two or more options exists in the application ahead of first use of the application. Callers that have not opted in or that do not have a messaging channel will not be treated using visual prompts and the V-tags will be ignored for those callers.

If the caller calls in with a communications device that does not support text message receipt, such as a fixed analog telephone, then the caller may still receive visual menu options through text messages sent to a separate communications device like a computer connected to the Internet, for example. In this case, the system would have to obtain the messaging address to use from the caller at the beginning of IVR interaction if the user desires that options be sent in a visual message. In some cases callers who do not have messaging capabilities on the device used to make the call into CC 103 are treated using voice only by default. However, IVR unit 112 may still ask callers if the communication appliance used to call in is able to receive text messages before ruling out visual prompting for that caller.

Figure 2:
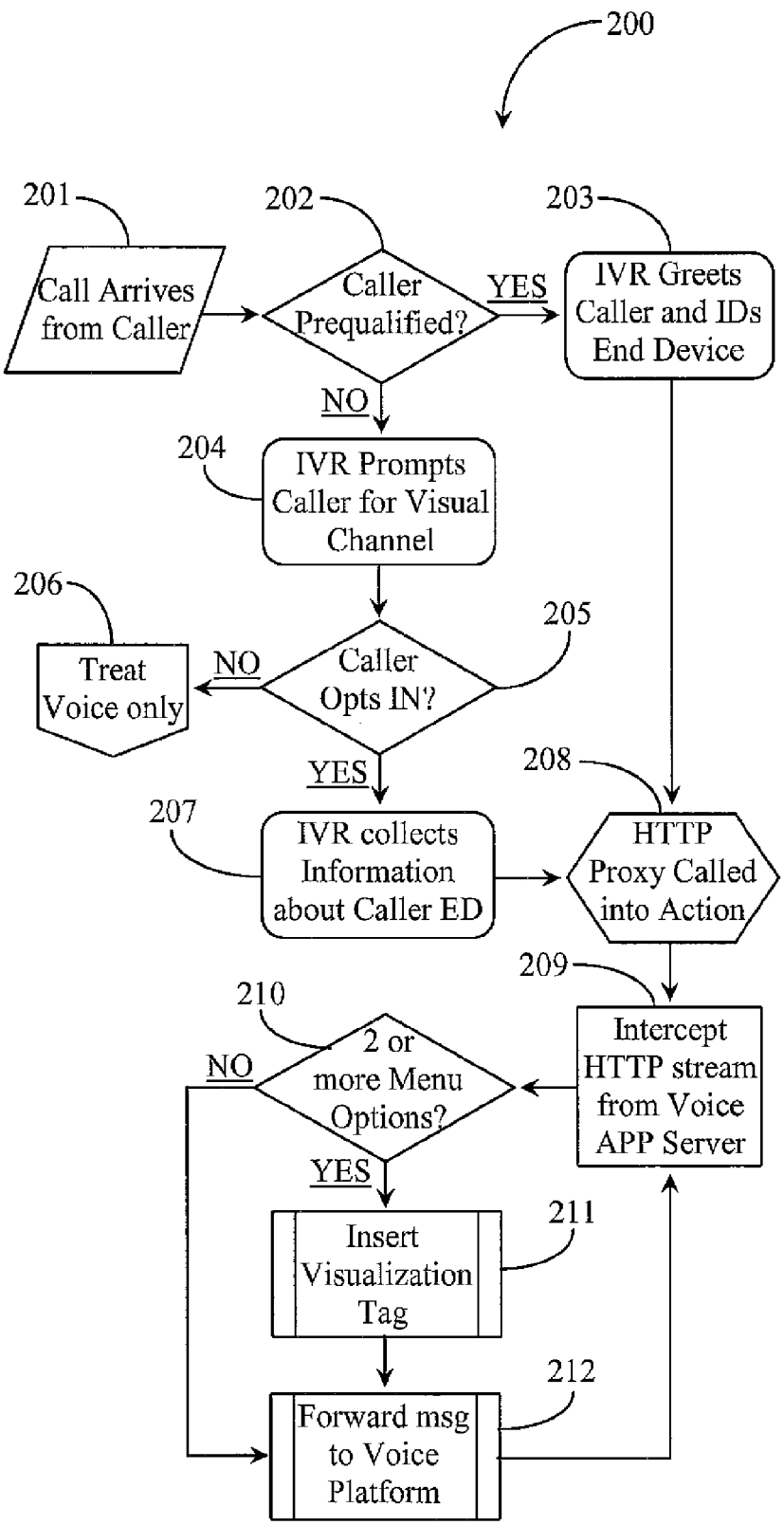
FIG. 2 is a process flow chart illustrating steps for dynamically adding and operating a visual channel to a customer service voice application.

FIG. 2 is a process flow chart 200 illustrating steps for dynamically adding and operating a visual channel to a customer service voice application. At step 201 a call arrives at a call center from a caller. At step 202 the IVR system determines if the caller has been prequalified for visual prompting over a text message channel. Prequalification may be performed during the caller identification process using automatic number identification service (ANIS). The number of the caller's communications appliance may be checked against a database of customer information including name, contact information, and any prequalification data obtained and stored by the system during a previous interaction with the caller relative to the same communications appliance.

If at step 202 the system determines that the caller is prequalified for accepting visual prompting using a text messaging channel, then at step 203 the system greets the caller and identifies the end device of the caller. Prequalification means that the system has already configured this user to receive text messages providing visualization of voice rendered menu options from a voice application. In one embodiment the messaging capabilities of the end device are identified by device serial number lookup, the serial number provided in advance by the calling or called party.

If at step 202 the caller is not prequalified to receive text visualization of IVR menu options, the IVR may prompt the caller if the caller would like to have menu options sent as text messages in conjunction with IVR voice rendering of the same VXML options at step 204. During this interaction with the IVR, the IVR might also confirm that the end device or appliance used to call into the center has text message capability sufficient to practice the invention using the same appliance for both voice and text interaction. An end device may be one of a cellular telephone, a personal digital assistant, a smart phone, or a computing appliance running a telephony application.

At step 205, the system determines if the caller has opted in. If the caller has not opted in at step 205, the IVR treats the caller with voice only at step 206. This may be the default treatment if the appliance used to call into the center has no text messaging capability. The caller may reject the option if the caller simply desires that voice only mode be used for IVR interaction.

If the caller has opted in at step 205, then the IVR unit may collect information about the caller and the end device used by the caller to place the call to the call center at step 207. The process moves to step 208 from step 203 or from step 207 depending on the results of the decision steps 202 and 205. At step 208, the IVR system calls a proxy server running a VXML tagging SW such as V-Tag SW 113. At step 209, the proxy server intercepts the VXML stream from the voice application server before it gets to the IVR unit for the purpose of dynamically tagging the appropriate menu options of the application.

The proxy server begins receiving HTTP messages from the VXML server and determines at step 210 if a menu option is received that will be rendered as a sequence of voice options to the caller. If at step 210 the system determines that no menu options have been received, the messages are simply passed on to or forwarded to the voice platform for speech rendering at step 212. The process then resolves back to step 209 and back to step 210 until the system detects a menu having two or more options at step 210. A menu having only one option, for example, requiring a simple yes or no response, may be ignored for tagging because there would be no practical reason for visualizing the option.

If at step 210 the system determines that an intercepted HTTP message infers a voice application menu containing two or more selectable options, then at step 211 the proxy server running V-tagging SW inserts a visualization tag in front of the menu and forwards it to the IVR unit or voice platform at step 212. Steps 210, 211, and 212 may be repeated as long as the caller is still connected to the IVR system for as many menus as the caller must navigate. The process flow ends when the IVR session with the caller terminates due to routing, or call disposal.

In a preferred embodiment, the VXML applications are dynamically tagged so as not to waste time and resource. The next menu with two or more options in the VXML application running is tagged only when the caller will navigate it. The visual tag embedded in the VXML instructs a messaging server to render the selectable options of the menu to text in a text message and to send the text message to the caller's end device. In one embodiment where a VXML application has more than one menu with two or more options and the nature of the application is that a caller will, by default, navigate all of the menus, then the application may be pre-tagged and only the caller's text message address or number needs to be inserted when actual text messages are generated containing the selectable options. In most cases, a caller will only navigate menus and select options until some goal has been identified at which time the caller will either be transferred to a destination or will be disposed of by the IVR unit.

Figure 3:
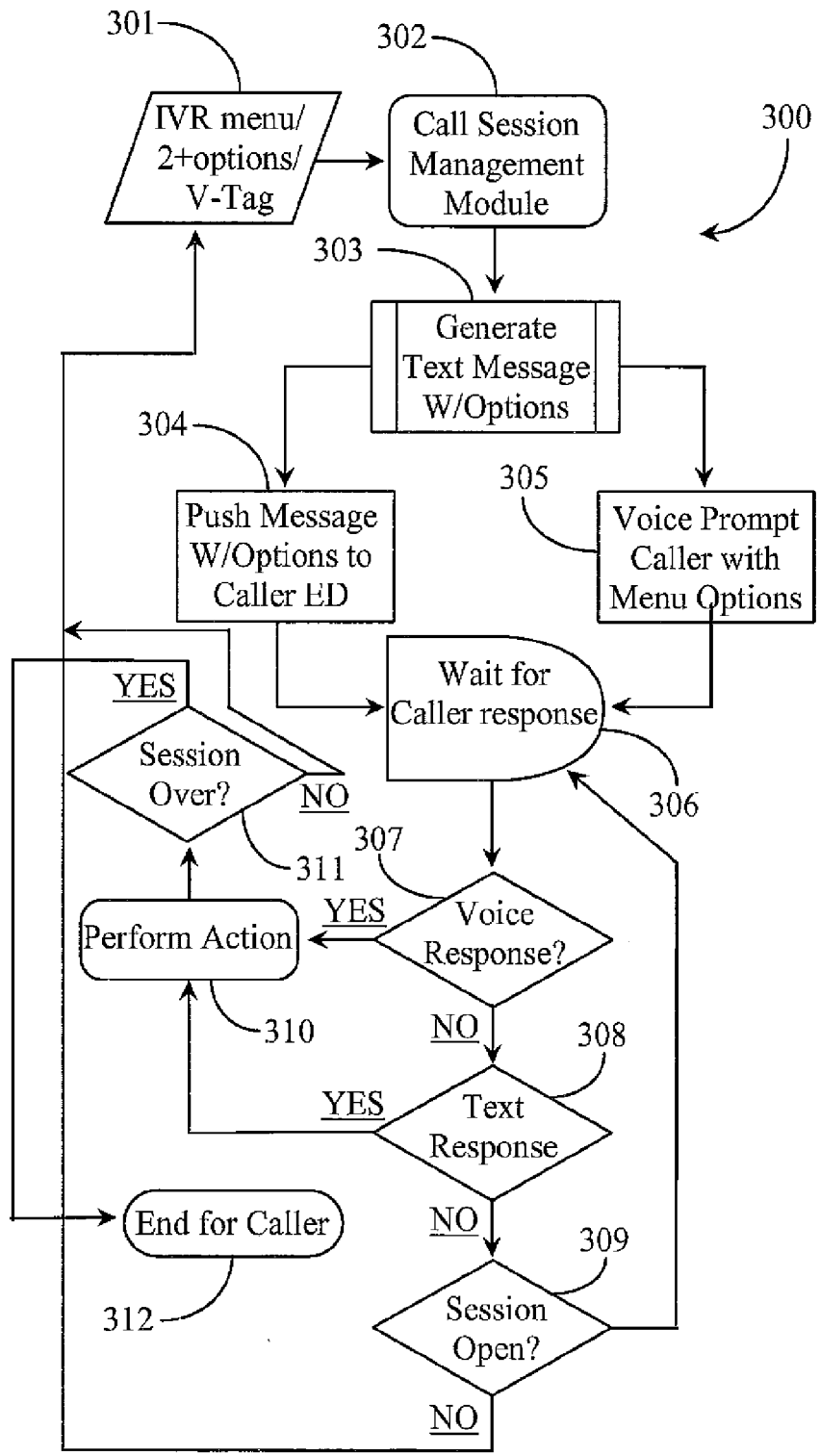
FIG. 3 is a process flow chart illustrating steps for servicing a customer using two or more IVR channels according to an embodiment of the present invention.

FIG. 3 is a process flow chart 300 illustrating steps for servicing a customer using two or more IVR channels according to an embodiment of the present invention. How chart 300 presumes that a caller is interacting with the IVR system and the system has reached a point of an embedded V-Tag associated with a menu containing two or more selectable options at step 301. The system may call or notify a session management module at step 302 for the purpose of managing session synchronization between the voice and text channels used to interact with the caller's end device or appliance. The session management module associates the two active IVR channels to a single end device and an active position in a running voice application.

At step 303, a message server may generate a text message containing all of the menu options. The text message may be a SMS or MMS message, or a Tweet, or other type of short message. The individual menu options may be associated with radio buttons enabling a caller to select an option generating a text message response to the message server connected to the IVR. A session management module may be provided in this case to ensure that the IVR unit is responsive to the caller's selection made in response to the text message in the form of a message reply.

Once a text message is generated at step 303, it may be pushed at step 304 to the caller's end device or communications appliance. The IVR unit may then render the menu options as voice played to the caller at step 305. It is important to note herein that the text message may be generated and sent before the voice rendering of the menu options is performed. This may give the caller time to see the entire set of options so that a response may be made with more efficiency.

At step 306 the system waits for a response from the caller. A response may come back over voice or text channel from the caller. For example, the caller may receive and display the text message containing the options, and may select an option in a text message reply without responding at all by voice to the voice rendered options. In this case, the session management module may ensure that the selection made in a text reply from the caller is implemented by the IVR system. In one aspect, the caller may vocalize the desired option while viewing the set of options received in a text message from the system, the vocalization picked up over the voice channel by the IVR before or during voice rendition of the options. In this case, the IVR recognizes the option vocalized by the caller without a requirement of waiting until any of or all of the menu options are rendered in voice.

At step 307 the system determines if there was a voice response back from the caller selecting an option from the menu. If at step 307 the system received and recognized a voice response from the caller, then at step 310 the system performs an action relative to the selected response. The system may determine if the IVR session is over as a result of the previous response detected at step 307. If the session is determined to be over at step 311 then the process ends for that caller at step 312.

If the system does not receive a voice response to the menu options texted and rendered as synthesized voice to the caller in steps 304 and 305 at step 307 ten the system determines if the caller responded by a text reply or response at step 308. If at step 308 the system detected that the caller responded by texting a response including the selection of the desired option, the process may resolve back to step 310 and then to step 311. If the response means that the IVR session is over for that caller then the process resolves back to step 312 and ends for that caller. Whether the caller has responded by voice or by text, if the system determines at step 311 that the session is not over, then the process may resolve back to step 301 when a next tagged menu option is reached by the IVR in interaction with the caller. In one aspect the session management module stays open to monitor the IVR dual channel session as long as the caller is still connected to the IVR unit.

If the system does not receive a voice response at step 307 or a text response at step 308, the system may determine if the session with the caller is still open at step 309. In one aspect a time period may be defined within which the system should receive a response from the caller. If the time period expires before a response is received for the previous prompt, the IVR may repeat the menu for the caller. The caller may also elect to hear the menu over again if repeating the menu is a selectable option.

If the system determines that the session with the caller is terminated the process may resolve back to step 301 for another caller. In such a case the caller dropped out of the system before responding to the IVR menu options. If at step 309 the system determines that the session is still open, the process may resolve back to step 306 where the IVR unit waits some additional time for the caller to respond. In one aspect no response to a menu option presented within a specified period of wait time leads to IVR unit terminating the call. It is noted herein that many callers are interacting with the IVR system simultaneously and the voice application, tagging process, and session management process are spawned for each individual caller connected to the switch.

In one embodiment of the present invention, a caller may select a presented option resulting in transfer of the caller from self service to live help thereby ending the IVR session for that caller. In such a case, it is still possible to use messaging to present choices to the caller from the perspective of the live agent assigned to help the caller by telephone.

Figure 4:
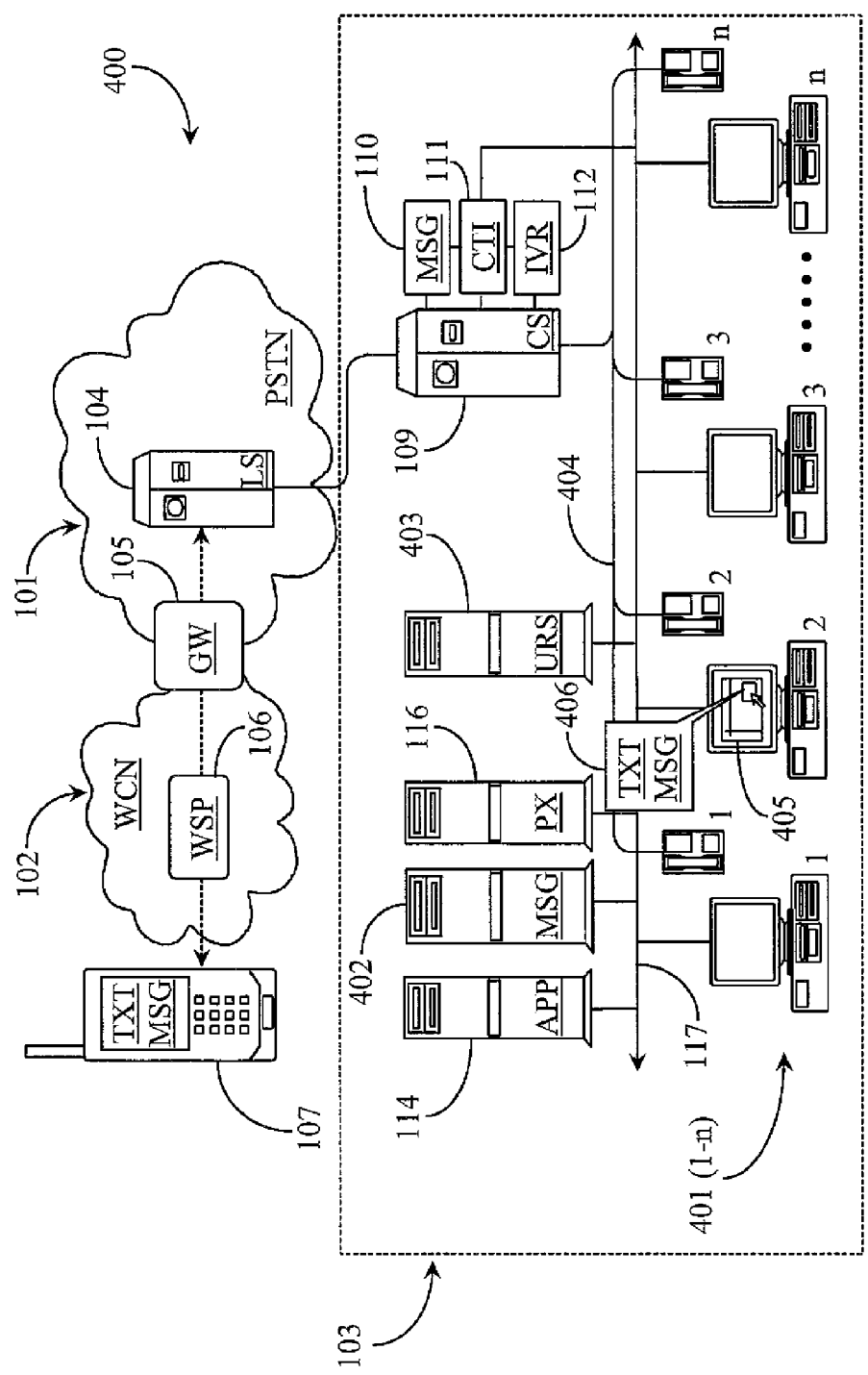
FIG. 4 is an architectural overview of a communications network supporting dynamic multi-channel customer service according to another embodiment of the present invention.

FIG. 4 is an architectural overview of a communications network 400 supporting dynamic multi-channel customer service according to another embodiment of the present invention. Communications network 400 includes PSTN 101, WCN 102 and CC 103 described earlier in this specification. This example includes many of the elements of the example of FIG. 1 and those elements not significantly changed in this example retain their element numbers and are not reintroduced.

In this example, as in the example of FIG. 1, a caller calls into CC 103 using communication appliance 107. Appliance 107 connects to WSP 106 in WCN 102, and the call is routed through GW 105 and LS 104 in PSTN 101 to CS 109 within center 103. IVR unit 112 interacts with the caller as previously described. In this embodiment the caller will be routed to a live agent operating one of agent workstations 401 (1-n). Agent workstations 401 (1-n) each include a personal computer (PC) connected to LAN 117 and a telephone connected to CS 109 via internal telephony wiring 404.

In this embodiment the call from communication appliance 107 is intercepted at switch 109 by IVR unit 112, and initially the interaction may be self service. However, at some point the caller opts to be transferred to a live agent, such as one operating agent workstation 401 (2), for example. LAN 117 supports a universal routing server (URS) 403. URS 403 has a digital medium coupled thereto or otherwise made accessible thereto that contains all of the data and SW required to enable function as a routing server. In this case the agent may, at some point during the transaction, recite a list of options or choices to the caller that the caller may select from to further process the transaction. An example of this might be the agent reciting the options for rendering payment for the transaction at hand.

Agent workstation 401 (2) has an agent desktop application 405 installed thereon and executable therefrom. Agent desktop application 405 is a visual interface that enables the agent to work much more efficiently with the caller. For example, information about the caller and reason for the call may be forwarded to agent desktop interface 405 ahead of the actual transaction. While the agent is conversing with the caller (using phone 2), the agent may reach a point in the conversation where a standardized set of choices needs to be presented to the caller by the agent. In this case, the caller may be sent a text message 406 manually from the agent desktop application where the text message 406 contains the standard options that the agent intends to recite to the caller over the open voice channel.

The text message in this case may be pre-configured based on the standardized choices that the customer is presented with in a specific circumstance. The agent may manually send text message 406 containing the selectable options from the agent desktop interface. The generated message may be sent to the caller by message server 402 or message server 110 connected to IVR unit 112. The text message may be sent at the same time or just before the agent verbalizes the options or choices to the client. Much like the IVR embodiment, the client may respond to the received text message containing the selectable options by voice before the agent has time to verbalize all of the options or by selecting an option in a text response.

The agent may finish the transaction based on the response from the caller. The typical live voice options read to a customer may be pre-configured as a text message template (406) including the boilerplate (options) where only the address of the communication device of the caller needs to be inserted into the message before send. Information forwarded to the agent desktop application before the transaction arrives may include the telephone number (SMS address/MMS address) and confirmation of the pending messaging action that only requires addressing for send. The system may automatically address the message using ANIS information from the IVR unit where the messaging address is the caller's phone number The text channel between the caller device and the agent computer can be used to help illustrate options that otherwise could only be spoken to the caller.

Figure 5:
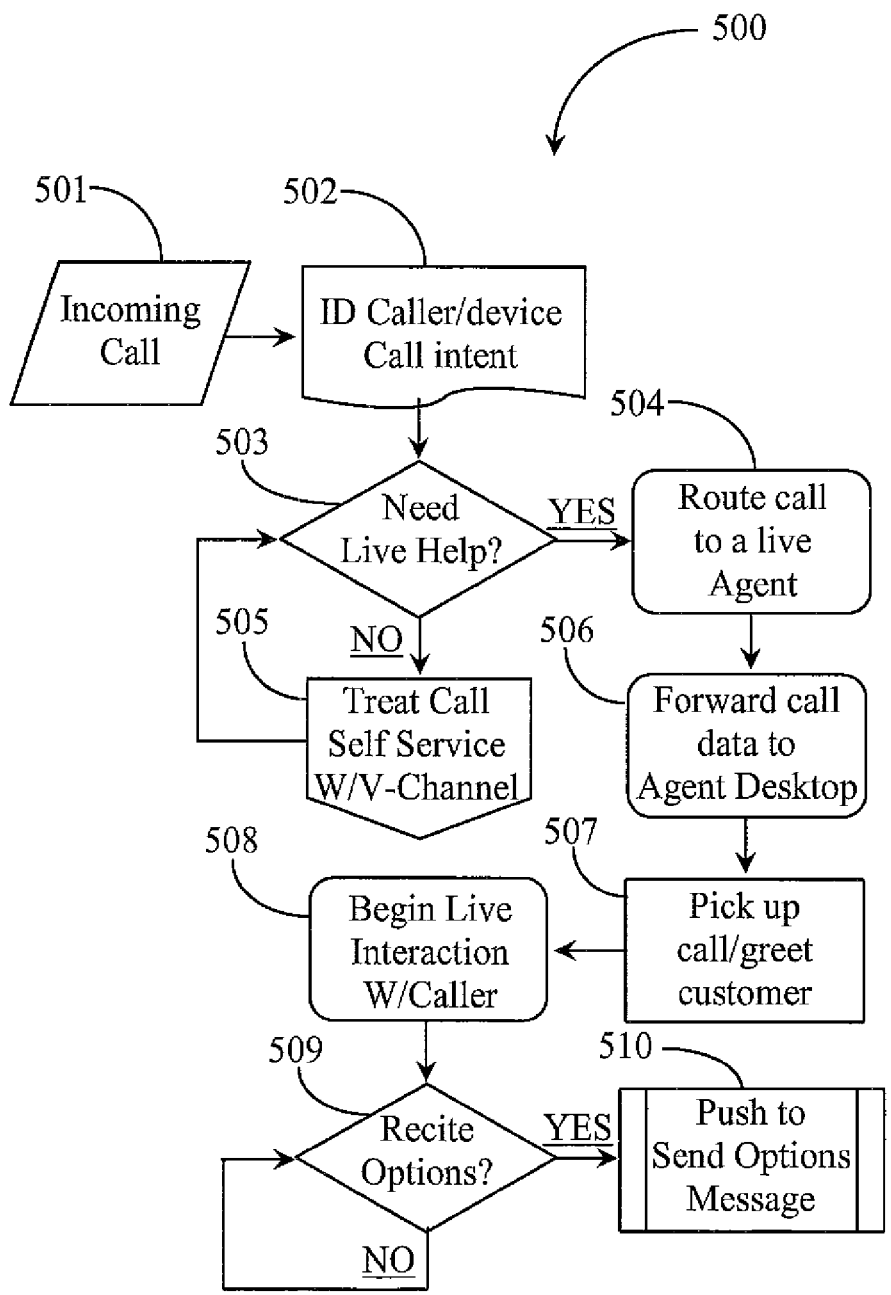
FIG. 5 is a process flow chart illustrating steps for live interaction with a customer using two or more channels according to an embodiment of the present invention.

FIG. 5 is a process flow chart 500 illustrating steps for live interaction with a customer using two or more channels according to an embodiment of the present invention. At step 501 the system receives an incoming call. At step 502 the system identifies the caller, the caller's communication device and the reason for the call. It is presumed in this example that the caller is prequalified to use the visual text channel. It is noted herein that in one embodiment destination number identification service (DNIS) is used to identify a user that has been called by an outbound dialing service connected to the IVR.

At step 503 the system determines if the caller requires live help. If the system determines that the caller will not require a live agent to assist, then the IVR system treats the call as a self service call at step 505 with the capability of utilizing a text channel during the call as previously described above. The process may resolve back to step 503 anytime the system detects that the caller needs live assistance. If the system determined at step 503 that the caller needs live help the call is routed to a live agent at step 504. In this aspect, the call data including the SMS address is forwarded to the agent desktop application of the agent working with the caller before the actual transaction arrives as a ringing event.

At step 507 the agent may pick up the call and may greet the caller or customer. At step 508 the agent begins live interaction with the caller in an attempt to service the caller satisfactorily. At step 509 the agent determines if he or she must recite a list of choices or options to the caller. These choices or options should be more or less standardized such that at least all of the same options would be in a preconfigured text message template ready to launch in the agent's desktop application.

At step 509 if the agent has not yet recited a list of selectable choices or options, the process may loop back on the same step until the agent has to recite two or more choices or options hat the customer may select from. If the agent has to recite two or more options or choices to the caller as determined at step 509, the agent pushes a send button or other mechanism associated with the pre-configured text message to send the message including the options or choices for selection to the caller at step 510.

It will be apparent to one with skill in the art that the multi-modal customer interaction system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for contact center messaging, comprising:
    an IVR unit for executing an IVR script;
    a processor; and
    a memory, wherein the memory has program instructions stored thereon that, when executed by the processor, cause the processor to:
        tag one or more portions of the IVR script;
        associate one or more text messages with the tagged one or more portions;
        execute the tagged IVR script during a caller interaction;
        transmit the associated text message to the caller when one of the tagged portions of the IVR script is encountered;
        turn over the interaction with the caller to a live agent at a station to which the call is routed; wherein the station is a computerized appliance executing a desktop application, and the desktop application provides text messages of choices the live agent may wish to communicate to the caller, and when the live agent encounters a point in the voice interaction where the agent determines to send a choice to the caller, the agent is enabled to select the associated text message and enter the text message destination address of the caller to send the text message.

2. The system of claim 1, further comprising a session management module for managing which portions of the IVR script may be tagged.

3. A method for operating a contact center, comprising:
    tagging, by a processor, one or more individual portions of an IVR (interactive voice response) script;
    associating, by the processor, text messages with the one or more individual tagged portions of the IVR script;
    executing the tagged IVR script during a caller interaction;
    when one of the tagged portions of the IVR script is encountered, transmitting the associated text message to the caller; and
    turning over the interaction with the caller to a live agent at a station to which the call is routed; wherein the station is a computerized appliance executing a desktop application, and the desktop application provides text messages of choices the live agent may wish to communicate to the caller, and when the live agent encounters a point in the voice interaction where the agent determines to send a choice to the caller, the agent is enabled to select the associated text message and enter the text message destination address of the caller to send the text message.

4. The method of claim 3, further comprising transmitting an audible rendering of at least one tagged portion of the script to the caller.

5. The method of claim 4, wherein the associated text message is transmitted prior to transmitting an audible rendering of the at least one tagged portion of the script.

6. The method of claim 3, further comprising querying a caller as to whether text messaging is desired.

7. The method of claim 6, wherein tagging of the IVR script is performed only if a response is received indicating a desire to receive text messages.

8. The method of claim 3, further comprising determining whether an available caller appliance is capable of displaying text messages.

9. The method of claim 3, wherein the text message is an SMS (short message service) message.

10. The method of claim 3, further comprising parsing the IVR script to determine which portion or portions are to be tagged.

11. The method of claim 10, wherein the IVR script comprises a query to determine an address for transmission of text messaging.

12. The method of claim 3, wherein the tagged portion corresponds to a point in the script for offering choices to a caller, and the text message provides for a visual representation of the offered choices.

13. The method of claim 3, wherein the one or more tagged portions comprises choices to be presented to a caller.

14. The method of claim 3, wherein tagging comprises using Java tags to tag one or more individual portions of a VXML (voice extensible markup language) application.

\* \* \* \* \*